United States Patent [19]
Oike et al.

[11] Patent Number: 5,939,165
[45] Date of Patent: Aug. 17, 1999

[54] SURFACE SKIN-COVERED MOLDED CUSHIONING MATERIAL AND PROCESS FOR PRODUCING THE SAME

[75] Inventors: Hidekazu Oike; Teruo Akita, both of Nagoya, Japan

[73] Assignee: Howa Kasei Co., Ltd., Nagoya, Japan

[21] Appl. No.: 08/936,301

[22] Filed: Sep. 24, 1997

[51] Int. Cl.$^6$ ........................................................ B32B 3/00
[52] U.S. Cl. .................... 428/71; 428/192; 428/317.5; 428/904; 264/46.5
[58] Field of Search .................................... 428/71, 317.5, 428/319.9, 192, 178, 904; 264/46.5

[56] References Cited

U.S. PATENT DOCUMENTS

| | | | |
|---|---|---|---|
| 4,025,372 | 5/1977 | Fenton | 156/79 |
| 4,618,532 | 10/1986 | Volland et al. | 428/304.4 |
| 5,670,232 | 9/1997 | Bigolin | 428/71 |

FOREIGN PATENT DOCUMENTS 7-307  1/1995  Japan .

Primary Examiner—James J. Bell
Attorney, Agent, or Firm—Frishauf, Holtz, Goodman, Langer & Chick, P.C.

[57] ABSTRACT

Disclosed are a surface skin-covered molded cushioning material which comprises a base material 1 having a main body the surface of which is covered with a surface skin material 4 via a cushion layer 3, wherein the main body of the base material and the surface skin material comprise a material which does not permit flowing of foamed gas generated at the time of forming the cushion layer and flowing of a synthetic resin material for forming the cushion layer; a sealing material 2 comprising a material which permits flowing of the foamed gas and does not permit flowing of the synthetic resin material is arranged at the circumferential portion of the main body of the base material; and the circumferential portion of the surface skin material covers the sealing material and also reaches the circumferential portion of the back face of the main body of the base material, and a process for producing the same.

18 Claims, 4 Drawing Sheets

SURFACE SKIN-COVERED MOLDED CUSHIONING MATERIAL AND PROCESS FOR PRODUCING THE SAME

BACKGROUND OF THE INVENTION

This invention relates to a surface skin-covered molded cushioning material which is mainly used as an interior finishing material of a vehicle, such as an armrest for an automobile, and a process for producing the same.

A surface skin-covered molded cushioning material in which the surface of a base material is covered with a surface skin material via a cushion layer and said cushion layer is integrated with said base material and said surface skin material has conventionally been used widely as an interior finishing material of a vehicle or the like. This kind of conventional surface skin-covered molded cushioning material is produced by matching a bottom split mold in which a surface skin material is closely contacted by suction with the inner surface thereof and a top split mold in which a base material is set so that the circumferential portion of said base material is closely contacted with the vicinity of the circumferential portion of said surface skin material; pouring a foamable synthetic resin material into a space formed between said base material and said surface skin material; and forming said synthetic resin material to mold a cushion layer. Therefore, together with gas (hereinafter referred to as "foamed gas") generated as a result of foaming of said synthetic resin material, said synthetic resin material is oozed out from the close contact face of said base material and said surface skin material and attached to the back face of said base material, which causes problems such as fitting failure of a produced molded cushioning material to a vehicle and lowering of fitting precision.

As a measure for solving the problems, it has been attempted to apply adhesive sealing to the entire circumferential portion of said close contact face. However, there are problems that a complicated operation is required, degassing cannot be carried out and said surface skin material is wrinkled or said surface skin material is swelled due to the influence of residual gas in said space.

SUMMARY OF THE INVENTION

The present invention has been made for the purpose of providing a surface skin-covered molded cushioning material in which the problems in the prior art as described above can be solved, and a process for producing the same, i.e., for the purpose of providing a surface skin-covered molded cushioning material in which a foamable synthetic resin material is not oozed out to give good finishing and also fitting failure to a vehicle does not occur to give high fitting precision, and a process for producing the same with good yield.

That is, the present invention relates to a surface skin-covered molded cushioning material which comprises a base material 1 having a main body the surface of which is covered with a surface skin material 4 via, a cushion layer 3, wherein the main body of said base material and said surface skin material comprise a material which does not permit flowing of foamed gas generated at the time of forming said cushion layer and flowing of a synthetic resin material for forming said cushion layer; a sealing material 2 comprising a material which permits flowing of said foamed gas and does not permit flowing of said synthetic resin material is arranged at the circumferential portion of the main body of said base material; and the circumferential portion of said surface skin material covers said sealing material and also reaches the circumferential portion of the back face of the main body of said base material.

Further, the present invention relates to a process for producing a surface skin-covered molded cushioning material, which comprises the steps of:

A. closely contacting a surface skin material 4 comprising a material which does not permit flowing of foamed gas generated at the time of forming a cushion layer 3 and flowing of a synthetic resin material for forming said cushion layer, by suction with the inner face of a bottom split mold;

B. setting a base material 1 in which a sealing material 2 comprising a material which permits flowing of said foamed gas and does not permit flowing of said synthetic resin material is previously fixed by adhesion to the circumferential portion of a main body thereof, in a top split mold;

C. matching the top split mold and the bottom split mold and closely contacting the circumferential portion of the main body of the base material and the circumferential portion of the surface skin material with each other via the sealing material to form a space for molding the cushion layer between the main body of said base material and said surface skin material; and D. pouring a foamable synthetic resin material into the space for molding the cushion layer and foaming said synthetic resin material to mold said cushion layer.

Japanese Patent Publication No. 307/1995, the disclosure of which is herein incorporated by reference, discloses a polyurethane foam being useful as a cushioning material and a process for producing it, which forms a material and an operating condition for forming a cushion layer 3 of this specification.

DESCRIPTION OF THE PREFERRED EMBODIMENTS

In the following, preferred embodiments of the present invention are shown.

Figure 1:
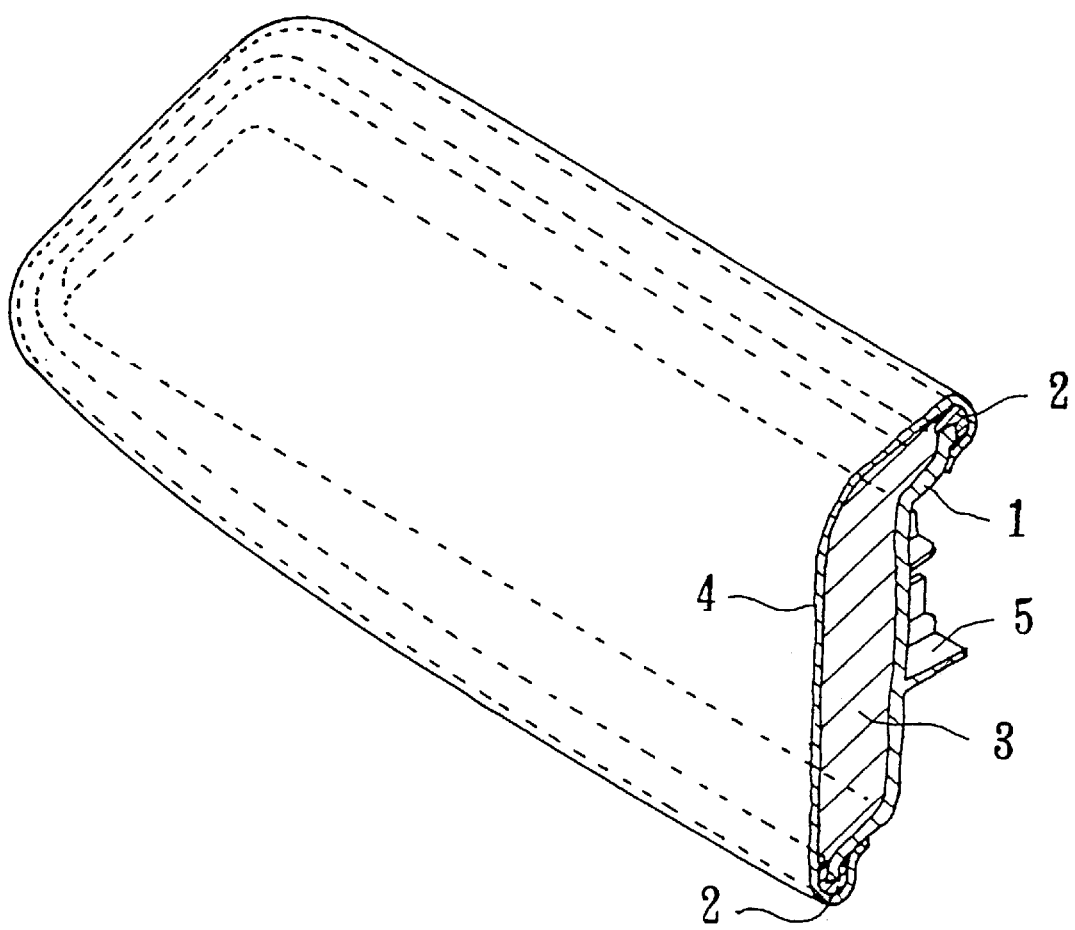
FIG. 1 is a partially cut-out perspective view showing an armrest for a vehicle, which is one embodiment of the surface skin-covered molded cushioning material of the present invention.

First, an armrest for an automobile as one embodiment of the surface skin-covered cushioning material of the present invention is shown in FIG. 1.

In the armrest for an automobile shown in FIG. 1, the surface of a main body of a base material 1 is covered with a surface skin material 4 via a cushion layer 3.

In the base material 1, a sealing material 2 which is permeable to gas and is not permeable to a cushion layer-forming material is arranged only at the circumferential portion of the main body molded from a hard synthetic resin with good adhesion such as an ABS resin so as to have a desired armrest shape.

The sealing material 2 has properties of permitting flowing of gas (hereinafter referred to "foamed gas") generated at the time of forming the cushion layer 3 and not permitting permeation or leakage (permitting slight immersion) of a foamable synthetic resin material which is a material for forming the cushion layer 3 and has a required viscosity (about 1,300 cps) (for example, a material containing polyurethane, which can form a soft porous plastic having fine continuous pores). As a specific example thereof, there may be mentioned a polyurethane foam and various non-woven fabrics, but a polyurethane foam is preferred in the points that it is inexpensive, is the same kind as said foamable synthetic resin material and has good adhesion. As a specific embodiment thereof, a tape-shaped polyurethane foam is preferred in the point of handling. As a specific example thereof, there may be mentioned a commercially available crevice-sealing tape made of polyurethane (a tape in which a pressure-sensitive adhesive material is coated on one surface thereof and said pressure-sensitive adhesive material is covered with a releasing paper). A polyurethane tape having a thickness of 2 to 10 mm, preferably 3 to 5 mm and a width of 5 to 20 mm, preferably 8 to 12 mm is used.

On the other hand, the surface skin material 4 may be any material so long as it has properties of not permitting flowing of the above foamed gas and also not permitting permeation or leakage of the above foamable synthetic resin material and further it has desired appearance and feeling. As a representative example thereof, there may be mentioned a material which is not permeable to gas, such as a vinyl chloride sheet and a synthetic leather sheet, and a material obtained by laminating a plastic film such as vinyl chloride on the back face of a material which is permeable to gas, represented by a cloth such as moquette.

The cushion layer 3 is a foamed and molded synthetic resin comprising a known material represented by a polyurethane foam, which is foamed and molded in a space formed between the main body of the base material 1 and the surface skin material 4 and integrated with both of them, and has a cushioning function. A material, a formulation ratio and a molding process may be suitably selected depending on desired characteristics, for example, hardness and the like.

In FIG. 1, a reference numeral 5 is an engagement piece which is arranged at the back face of the base material 1 and used for fitting the armrest to a vehicle.

Here, the sealing material 2 is arranged only at the circumferential portion of the main body constituting the base material 1. In the region where the sealing material 2 covers the circumferential edge of the back face of said main body, said sealing material is covered with the vicinity portion of the circumferential edge of the back face of said surface skin material. Further, the circumferential edge of the back face of said surface skin material is fixed by an adhesive or the like so that it directly covers the vicinity portion of the circumferential edge of the back face of said main body.

In the cushioning material constituted as described above, even if the cushion layer 3 is foamed and molded in the space formed between the base material 1 and the surface skin material 4, since the sealing material 2 which is permeable to foamed gas and is not permeable to a cushion layer-forming material is arranged at the circumferential portion of the main body of the base material 1, a clearance for degassing by arranging the sealing material 2 is formed between the circumferential edge of the main body of the base material 1 and the circumferential portion of the surface skin material 4 at the time of foaming and molding the cushion layer 3. Therefore, the foamed gas is vented to the outside through said clearance, and the synthetic resin material for forming the cushion layer 3 is prevented from leaking to the outside through said clearance and attaching to the back face of the main body of the base material 1, which becomes a face to be used for fitting the armrest to a vehicle or the like.

Therefore, said armrest has beautiful finishing and does not suffer from fitting failure and lowering of fitting precision. Further, since the circumferential portion of said main body is protected by the sealing material 2, the surface skin-covered cushioning material of the present invention has various advantages that the edge of a final molded product becomes elastic and soft, and at the time of a traffic accident, impact to a human body can be alleviated to reduce damage and the surface skin material 1 is scarcely damaged by the circumferential portion of said main body to enable use thereof for a long time.

Figure 2:
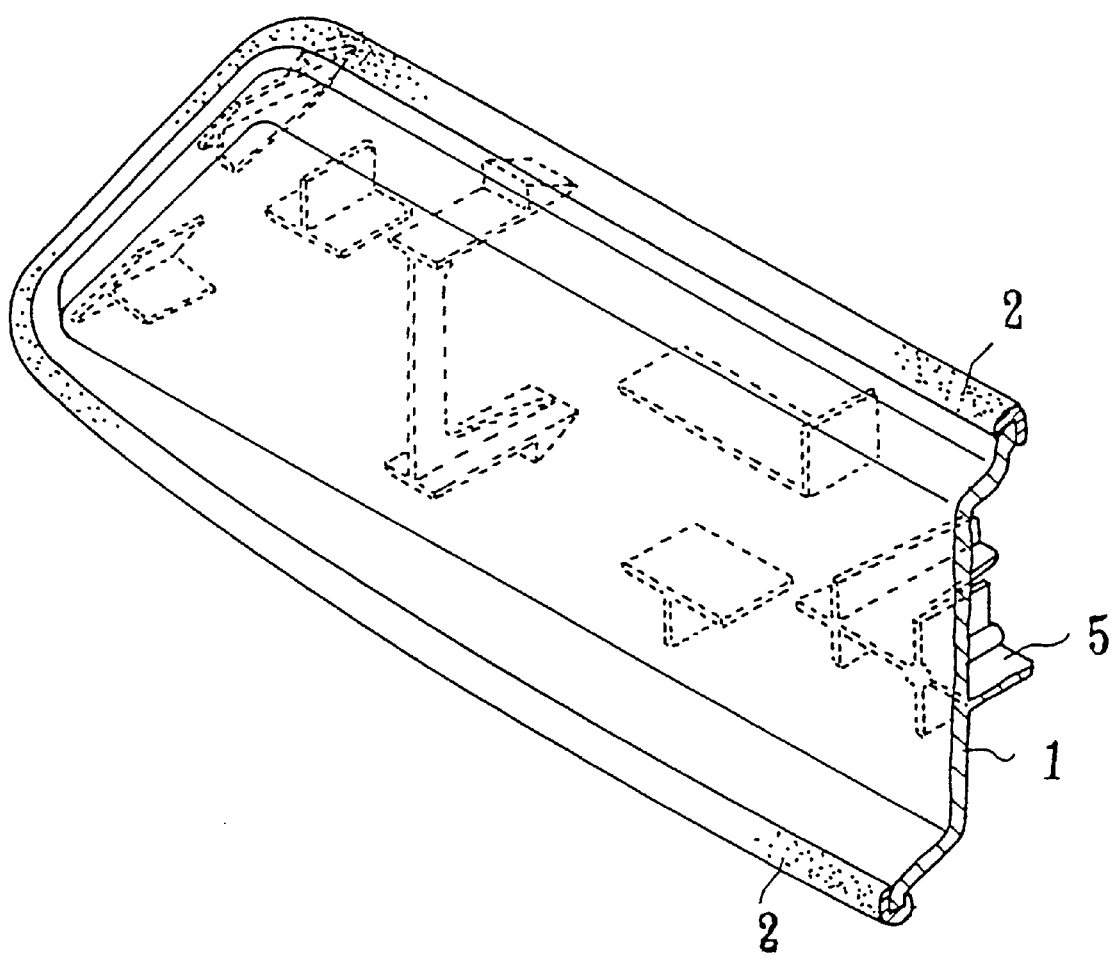
FIG. 2 is a partially cut-out perspective view showing a base material of the surface skin-covered molded cushioning material shown in FIG. 1.
Figure 3:
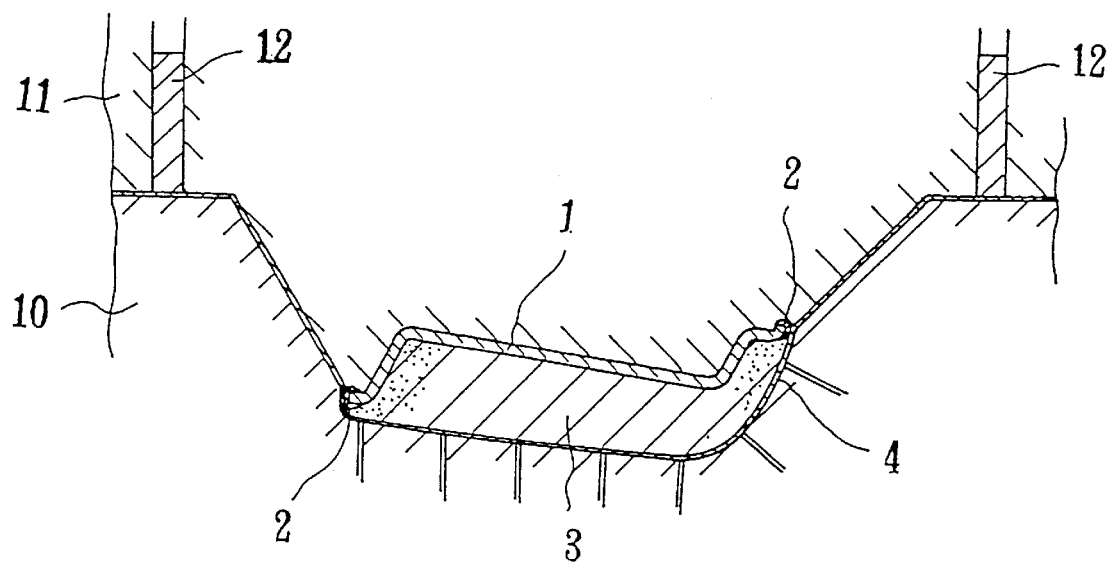
FIG. 3 is a sectional view showing one embodiment of a vacuum molding apparatus which is used for practicing the production process of the present invention.
Figure 4:
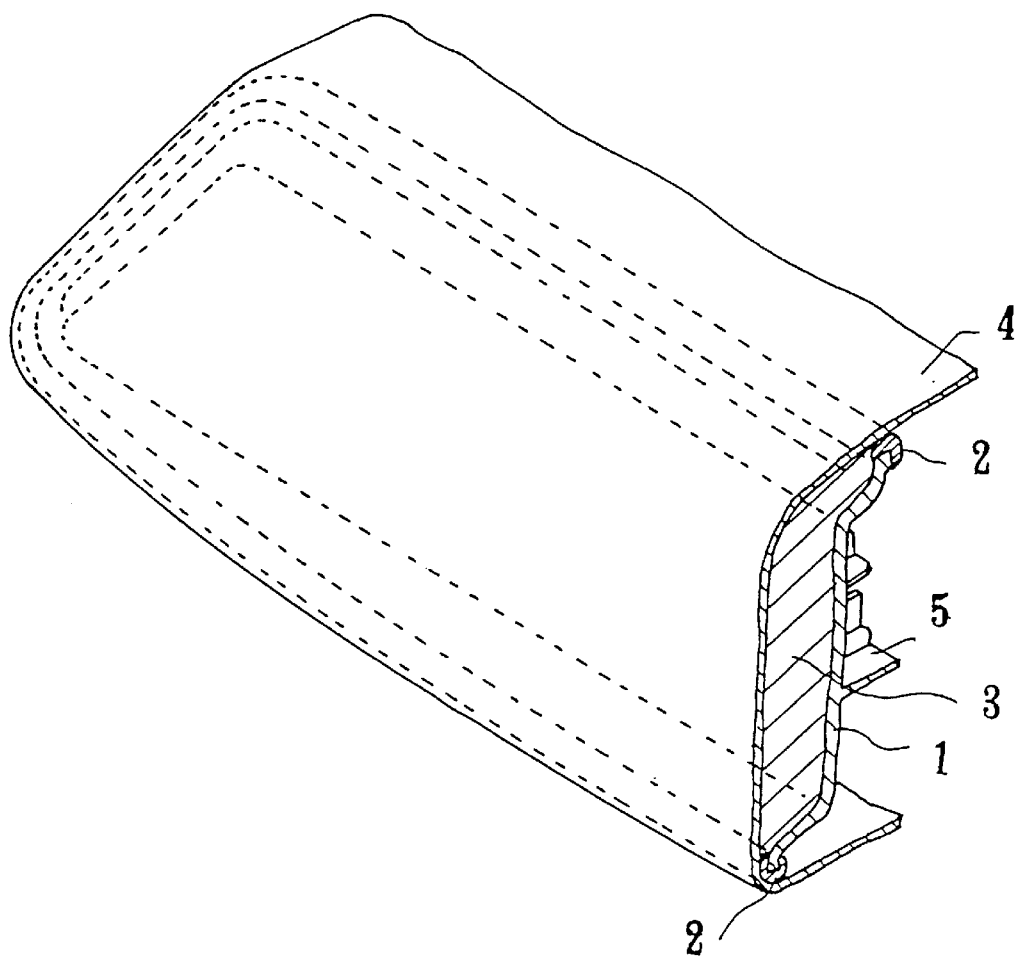
FIG. 4 is a partially cut-out perspective view showing one step of the production process of the present invention, i.e., a surface skin-covered molded cushioning material in a released state after completion of molding.

Next, as one embodiment of the molding process of the surface skin-covered cushioning material of the present invention, a process for producing the above armrest for an automobile is explained in detail by referring to FIG. 2 to FIG. 4.

In FIG. 3, 10 is a bottom split mold, and 11 is a top split mold which can be freely matched with the bottom split mold.

First, the surface skin material 4 is closely contacted by suction with the inner face of the bottom split mold 10.

On the other hand, the base material 1 in which the gas-permeable sealing material 2 is previously fixed by an adhesive or the like to the circumferential portion of the main body is temporarily held and set in the top split mold 11. When the top split mold 11 and the bottom split mold 10 are matched, the circumferential portion of the main body of the base material 1 set in the top split mold 11 is closely contacted with the circumferential portion of the surface skin material 4 closely contacted by suction with the inner face of the bottom split mold 10 via the sealing material 2 to form a space where the cushion layer 3 can be molded, between the main body of the base material 1 and the surface skin material 4. Then, the top split mold 11 and the bottom split mold 10 are clamped by a clamp 12, and a foamable synthetic resin material is poured into this space. When said synthetic resin material is foamed, since the sealing material 2 has properties of permitting flowing of foamed gas and not permitting leakage of said synthetic resin material, foaming and molding of the cushion layer 3 is continued without allowing foamed gas to stay in the inner portion of said space. On the other hand, said synthetic resin material does not leak from said space through a portion at which said sealing material is arranged, thereby forming a surface skin-covered cushion molded product having good quality in which said synthetic resin material is not attached to the back face of the main body of the base material 1, which becomes a face to be used for fitting an armrest to a vehicle or the like, and also said molded product does not suffer from fitting failure of said armrest to a vehicle or the like and lowering of fitting precision which are caused by leakage and attachment of said synthetic resin material. Thereafter, the top split mold 11 and the bottom split mold 10 are opened by releasing clamping thereof by the clamp 12, said molded product is released, an excessive portion of the surface skin material 4 covering the circumferential portion of the back face of the main body of the base material 1 is cut off, and the circumferential portion of said surface skin material is adhered to the back face of the main body of the base material 1 by using a conventional adhesion means such as an adhesive and a tacker.

As described above, according to the production process of the present invention, a characteristic surface skin-covered cushioning material can be produced easily with good yield.

We claim:

1. A surface skin-covered molded cushioning material which comprises:

a base material 1 having a main body, the main body having a surface which is covered with a surface skin material 4 via a cushion layer 3, wherein the main body of said base material and said surface skin material comprise a material which does not permit flowing of foamed gas generated at the time of forming said cushion layer and does not permit flowing of a synthetic resin material for forming said cushion layer; and a sealing material 2 comprising a material which permits flowing of said foamed gas and does not permit flowing of said synthetic resin material, said sealing material is arranged only at a circumferential portion of the main body of said base material, the circumferential portion of said surface skin material covers said sealing material and also reaches a circumferential portion of a back face of the main body of said base material.

2. The material according to claim 1, wherein the sealing material is a polyurethane tape.

3. The material according to claim 2, wherein the polyurethane tape has a thickness of 2 to 10 mm and a width of 5 to 20 mm.

4. The material according to claim 1, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

5. The material according to claim 2, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

6. The material according to claim 3, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

7. The material according to claim 4, wherein said material is an armrest for an automobile.

8. The material according to claim 5, wherein said material is an armrest for an automobile.

9. The material according to claim 6, wherein said material is an armrest for an automobile.

10. The material according to claim 5, wherein the surface skin material is a cloth lined with a plastic film.

11. The material according to claim 2, wherein the polyurethane tape has a thickness of 3 to 5 and a width of 8 to 12 mm.

12. The material according to claim 11, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

13. A process for producing a surface skin-covered molded cushioning material of claim 1, which comprises the steps of:

A. closely contacting a surface skin material 4 comprising a material which does not permit flowing of foamed gas generated at the time of forming a cushion layer 3 and flowing of a synthetic resin material for forming said cushion layer, by suction with the inner face of a bottom split mold;

B. setting a base material 1 in which a sealing material 2 comprising a material which permits flowing of said foamed gas and does not permit flowing of said synthetic resin material is previously fixed by adhesion to the circumferential portion of a main body thereof, in a top split mold;

C. matching the top split mold and the bottom split mold and closely contacting the circumferential portion of the main body of the base material and the circumferential portion of the surface skin material with each other via the sealing material to form a space for molding the cushion layer between the main body of said base material and said surface skin material; and D. pouring a foamable synthetic resin material into the space for molding the cushion layer and foaming said synthetic resin material to mold said cushion layer.

14. The process according to claim 13, wherein the sealing material is a polyurethane tape.

15. The process according to claim 1, wherein the polyurethane tape has a thickness of 2 to 10 mm and a width of 5 to 20 mm.

16. The process according to claim 13, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

17. The process according to claim 1, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

18. The process according to claim 15, wherein the main body of the base material comprises an ABS resin, the surface skin material is selected from the group consisting of a vinyl chloride sheet, a synthetic leather and a cloth lined with a plastic film, and the cushion layer comprises a polyurethane foam.

* * * * *